United States Patent [19]

Mizuhara

[11] Patent Number: 4,883,640

[45] Date of Patent: Nov. 28, 1989

[54] TITANIUM-NIOBIUM-NICKEL BRAZING ALLOY

[75] Inventor: Howard Mizuhara, Hillsborough, Calif.

[73] Assignee: GTE Products Corporation, Stamford, Conn.

[21] Appl. No.: 207,803

[22] Filed: Jun. 17, 1988

[51] Int. Cl.$^4$ .................. C22C 14/00; C22C 19/03; C22C 30/00
[52] U.S. Cl. .................. 420/417; 420/441; 420/580; 228/263.21; 228/263.13; 228/263.12; 228/121

[58] Field of Search .............. 420/417, 441, 580; 228/263.21, 263.13, 263.12, 121

[56] References Cited

U.S. PATENT DOCUMENTS 3,662,455  5/1972  Anderson .................. 420/425

Primary Examiner—L. Dewayne Rutledge
Assistant Examiner—David Schumaker
Attorney, Agent, or Firm—James Theodosopoulos

[57] ABSTRACT

A brazing alloy-filler metal for brazing parts made of TiAlNb alloys has a brazing temperature of about 1020° to 1250° C. and a composition of, in weight percent, 37–75 titanium, 5–43 niobium, 20–58 nickel.

6 Claims, No Drawings

TITANIUM-NIOBIUM-NICKEL BRAZING ALLOY

This invention discloses a brazing alloy - filler metal useful in joining, for example, titanium-aluminum-niobium (TiAlNb) alloys. Such TiAlNb alloys are useful in the aircraft industry because they are lightweight and can withstand elevated temperatures.

A brazing alloy-filler metal in accordance with this invention comprises 37-75% titanium, 5-43% niobium, 20-58% nickel, all percentages by weight, having a brazing temperature between about 1020° to 1250° Centigrade. Because the solution heat treatment temperature of the TiAlNb alloy is about 1200° C., brazing and solution heat treating can be advantageously carried out simultaneously when the brazing alloy of this invention is used.

U.S. Pat. No. 3,662,455 discloses a nickel-titanium-niobium alloy for metal-to-ceramic and ceramic-to-ceramic braze bonds especially useful in the manufacture of alkali metal vapor arc lamps. The alloy constituents lie within the following percentage weight ranges: 22.8-36.4% Ti; 26.9-42.9% Ni; 20.7-50.3% Nb.

A brazing alloy-filler metal as per the instant invention is outside the disclosure of U.S. Pat. No. 3,662,455 in titanium content. The density of the brazing alloy as per this invention is a closer match to the low density of a TiAlNb alloy than is the nickel-titanium-niobium alloy disclosed in 3,662,455.

Several TiNbNi alloys, as per this invention, in the form of small skull melted buttons were placed at the ends of T joints made from 65% Ti, 14% Al, 21% Nb alloy and brazed with the following results.

Brazing alloy number 5 (50 Ti, 15Nb, 35Ni) was brazed at 1040° C. for 10 minutes with an excellent full filleted joint.

Brazing alloy number 2 (60 Ti, 15Nb, 25 Ni) was brazed at 110° C. for 10 minutes with excellent results.

Brazing number M (40 Ti, 20 Nb, 40 Ni) was brazed at 1200° C. under 10$^{-5}$ Torr vacuum for 10 minutes with excellent results.

Brazing alloy number 6 (40Ti, 26 Nb, 35 Ni) was brazed at 1200° C. under 10$^{-5}$ Torr vacuum for 10 minutes with excellent results.

Photomicrographs of the joints showed excellent alloying with little sign of a seam. An additional 10 minutes hold time will eliminate the presence of the original filler metal. A homogeneous joint is considered ideal because a second phase can act as a stress riser and can lead to stress induced corrosion.

Table I shows the composition in weight percent of TiNbNi alloys within this invention on which solidus and liquidus temperatures were determined.

TABLE 1

| Sample | Ti | Nb | Ni | Sol. °C. | Liq. °C. |
|---|---|---|---|---|---|
| 1 | 70 | 5 | 25 | 938 | 1050 |
| 2 | 60 | 15 | 25 | 938 | 1076 |
| 3 | 50 | 25 | 25 | 933 | 1094 |
| 4 | 60 | 5 | 35 | 948 | 1050 |
| 5 | 50 | 15 | 35 | 934 | 1020 |
| 6 | 40 | 25 | 35 | 958 | 1145 |
| 7 | 50 | 5 | 45 | 933 | 1254 |
| 8 | 40 | 15 | 45 | 1108 | 1282 |
| 10 | 55 | 15 | 30 | 935 | 1010 |
| 11 | 45 | 15 | 40 | 946 | 1171 |
| D | 55 | 10 | 35 | 937 | 1020 |
| E | 45 | 20 | 35 | 938 | 1054 |
| J | 60 | 10 | 30 | 933 | 1000 |
| K | 50 | 10 | 40 | 928 | 1160 |
| L | 50 | 20 | 30 | 937 | 1020 |
| M | 40 | 20 | 40 | 1076 | 1172 |

I claim:

1. A brazing alloy having a brazing temperature of about 1020° to 1250° C. consisting of, in weight percent, 37-75 titanium, 5-43 niobium, 20-58 nickel.

2. The brazing alloy of claim 1 having a composition of 45 Ti, 20 Nb, 35 Ni.

3. The brazing alloy of claim 1 having a composition of 40 Ti, 25 Nb, 35 Ni.

4. The brazing alloy of claim 1 having a composition of 40 Ti, 20 Nb, 40 Ni.

5. The brazing alloy of claim 1 having a composition of 50 Ti, 15 Nb, 25 Ni.

6. The brazing alloy of claim 1 having a composition of 50 Ti, 15 Nb, 35 Ni.

* * * * *